(12) United States Patent
Ianev et al.

(10) Patent No.: US 11,445,355 B2
(45) Date of Patent: Sep. 13, 2022

(54) RRC INACTIVE STATE OPTIMIZATION

(71) Applicant: NEC Corporation, Tokyo (JP)

(72) Inventors: Iskren Ianev, Heidelberg (DE);
Sivasubramaniam Ramanan,
Heidelberg (DE); Toshiyuki Tamura,
Tokyo (JP); Hassan Al-Kanani,
Heidelberg (DE)

(73) Assignee: NEC CORPORATION, Tokyo (JP)

( * ) Notice: Subject to any disclaimer, the term of this patent is extended or adjusted under 35 U.S.C. 154(b) by 574 days.

(21) Appl. No.: 16/324,861

(22) PCT Filed: Dec. 26, 2018

(86) PCT No.: PCT/JP2018/047874
§ 371 (c)(1),
(2) Date: Feb. 11, 2019

(87) PCT Pub. No.: WO2019/138883
PCT Pub. Date: Jul. 18, 2019

(65) Prior Publication Data
US 2021/0337371 A1    Oct. 28, 2021

(30) Foreign Application Priority Data
Jan. 12, 2018 (EP) ................. 18151514

(51) Int. Cl.
*H04W 8/08* (2009.01)
*H04W 48/16* (2009.01)
*H04W 64/00* (2009.01)

(52) U.S. Cl.
CPC ............. *H04W 8/08* (2013.01); *H04W 48/16* (2013.01); *H04W 64/006* (2013.01)

(58) Field of Classification Search
CPC ...... H04W 8/08; H04W 48/16; H04W 64/006
See application file for complete search history.

(56) References Cited

U.S. PATENT DOCUMENTS

| | | | |
|---|---|---|---|
| 2015/0271727 A1* | 9/2015 | Harrang | H04W 28/26 370/229 |
| 2018/0167911 A1* | 6/2018 | Kota | H04W 36/04 |
| 2018/0176325 A1* | 6/2018 | Liang | H04L 67/02 |
| 2018/0199240 A1* | 7/2018 | Dao | H04W 76/10 |
| 2020/0112898 A1* | 4/2020 | Ramle | H04W 36/08 |
| 2021/0067945 A1* | 3/2021 | Liu | H04W 76/10 |

FOREIGN PATENT DOCUMENTS

| | | | | |
|---|---|---|---|---|
| EP | 2 725 852 A1 | 4/2014 | | |
| EP | 2725852 A1 * | 4/2014 | ........ | H04W 52/0222 |

OTHER PUBLICATIONS

Sony, TS 23.502: Provisioning parameter: Expected UE Mobility, Nov. 27-Dec. 1, 2017, 3GPP SA WG2 Meeting #124 S2-178407, Reno, US pp. 1-3 (Year: 2017).*
Sony, TS 23.502: Provisioning parameter: Expected UE Mobility, 3GPP SA WG2 Meeting #124 S2-178407, Nov. 27-Dec. 1, 2017, Reno, US (Year: 2017).*

(Continued)

*Primary Examiner* — Said M Elnoubi

(57) ABSTRACT

A core network node for mobility management includes a means for transmitting information related to expected mobility of user equipment, UE, to an access network node.

10 Claims, 9 Drawing Sheets

(56) References Cited

OTHER PUBLICATIONS

3GPP TS 23.501 V15.0.0 ,Technical Specification Group Services and System Aspects; System Architecture for the 5G System; Stage 2, Dec. 2017, Release 15 (Year: 2017).*

International Search Report and Written Opinion of the International Searching Authority in corresponding PCT application No. PCT/JP2018/047874 dated Mar. 8, 2019.

Japanese Office Action for JP Application No. 2020-535266 dated Sep. 28, 2021 with English Translation.

Sony, NEC, TS 23.502: Provisioning parameter: Expected UE Mobility[online], 3GPP TSG SA WG2 #124, S2-178407, Nov. 21, 2017, [date-of-search Sep. 21, 2021], on internet <URL:https://www.3gpp.org/ftp/tsg_sa/WG2_Arch/TSGS2_124_Reno/Do cs/S2-178407.zip>, p. 1, p. 2.

3rd Generation Partnership Project; Technical Specification Group Services and System Aspects; System Architecture for the 5G System; Stage2 (Release 15), 3GPP TS23.501 V15.0.0 (Dec. 2017), Dec. 22, 2017, [date-of-search Sep. 21, 2021], on internet <URL:https://www.3gpp.org/ftp/Specs/archive/23_series/23.501/23501-f00.zip>, 5.4.6.2 Section.

Nokia, Nokia Shanghai Bell, RAN-based Notification Area[online], 3GPP TSG RAN WG3 #97, R3-172885, Aug. 11, 2017, [dateofsearchSep. 21, 2021], on internet <URL:https://www.3gpp.org/ftp/tsg_ran/WG3_lu/TSGR3_97/Docs/R3-172885.zip>, 2 Section.

Japanese Office Action for JP Application No. 2020-535266 dated Feb. 22, 2022 with English Translation.

Huawei, HiSilicon, TS 23.502: Paging optimization for RRC Inactive[online], 3GPP TSG SA WG2 #122BIS S2-175554, Internet<URL: http://www.3gpp.org/ftp/tsg_sa/WG2_Arch/TSG2_122BIS_Sophia_Antipolis/Docs/S2-175554.zip>, Aug. 15, 2017.

Japanese Office Communication for JP Application No. 2020-535266 dated Jun. 21, 2022 with English Translation.

Nokia, Nokia Shanghai Bell, Sony, 23.501/SS 5.20: CP processing rules and Mobility Pattern correction, [online], 3GPP TSG SA WG2 #123, S2-177577, Internet<URL:http://www.3gpp.org/ftp/tsg_sa/WG2_Arch/TSGS2_123_Ljubljana/Docs/S2-177577.zip>, Oct. 30, 2017.

* cited by examiner

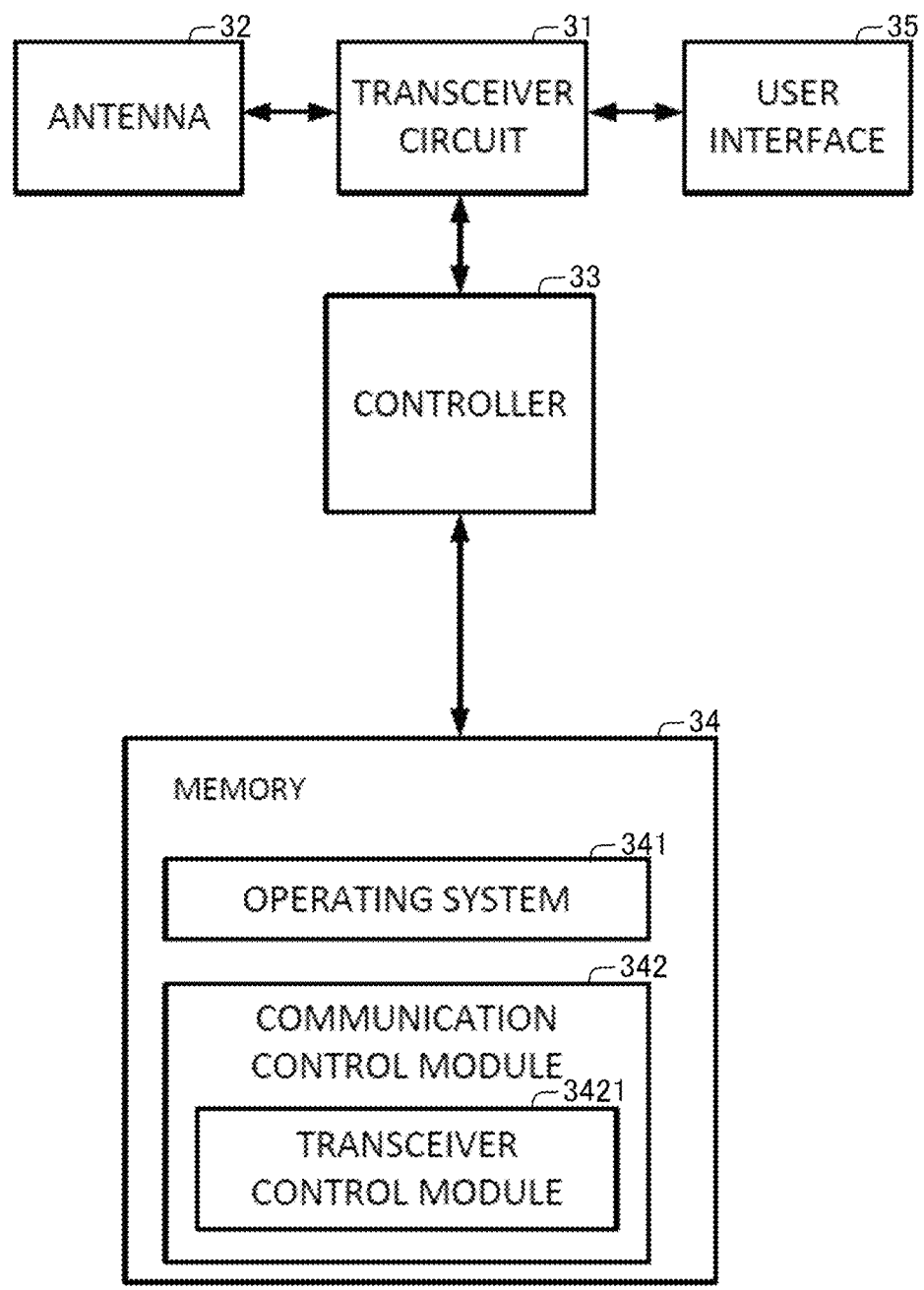

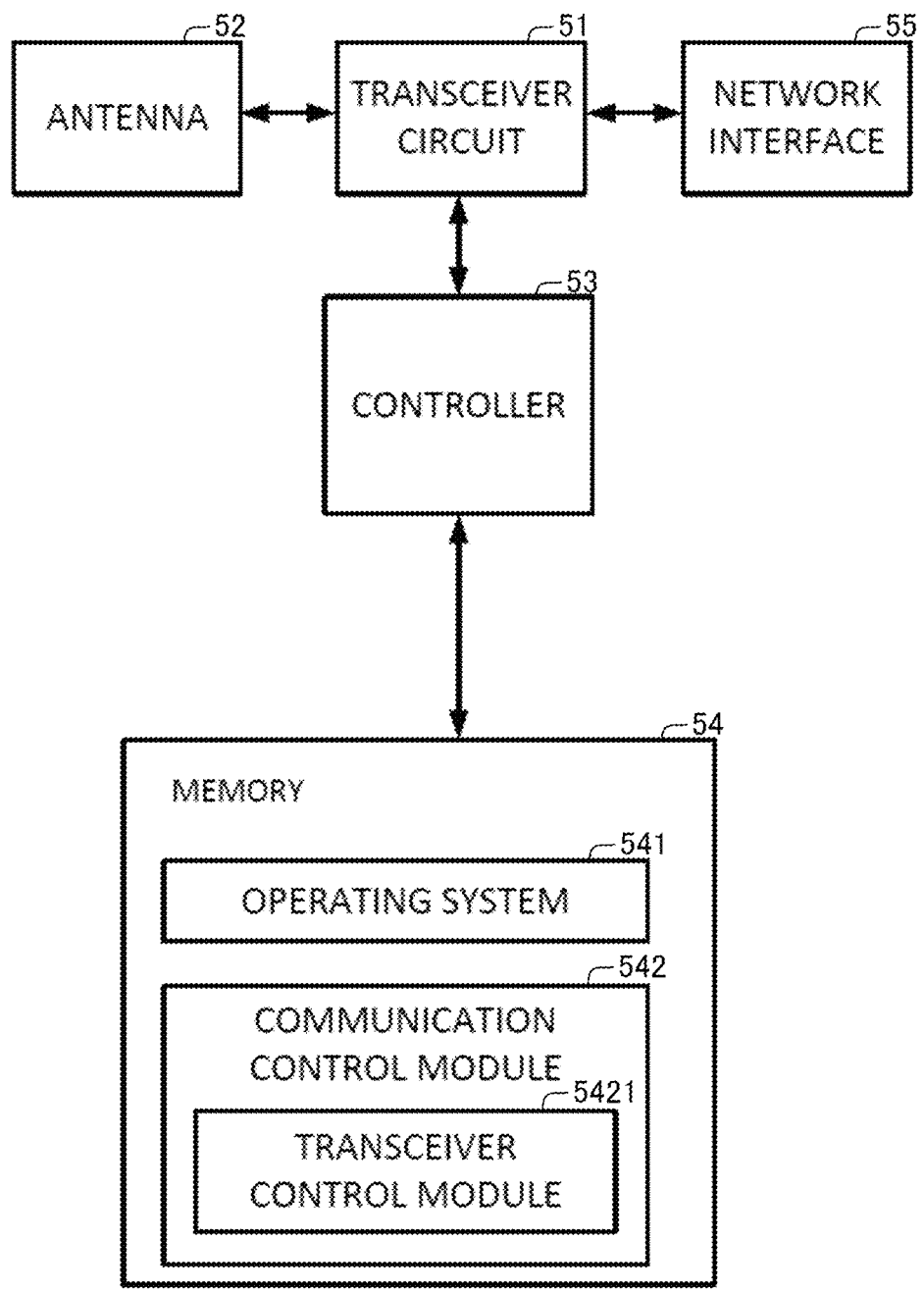

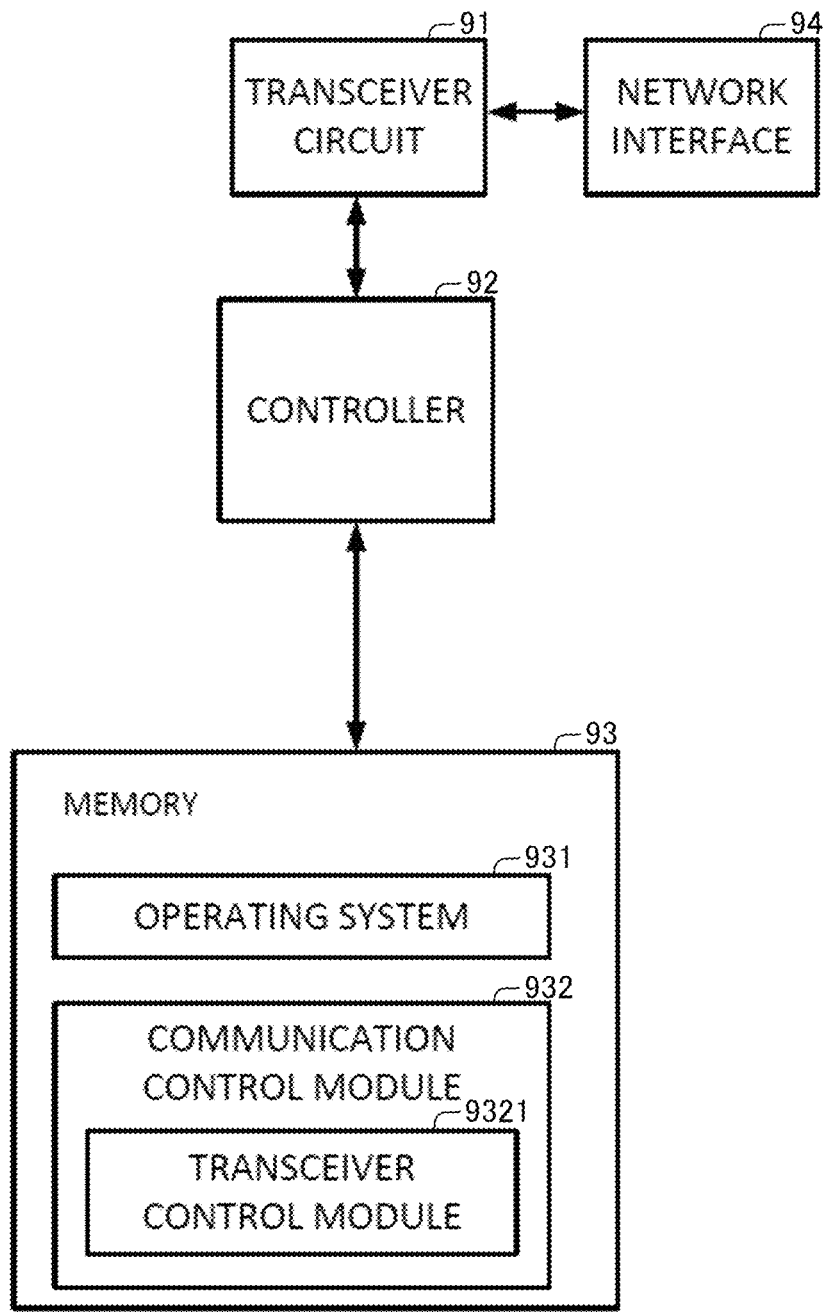

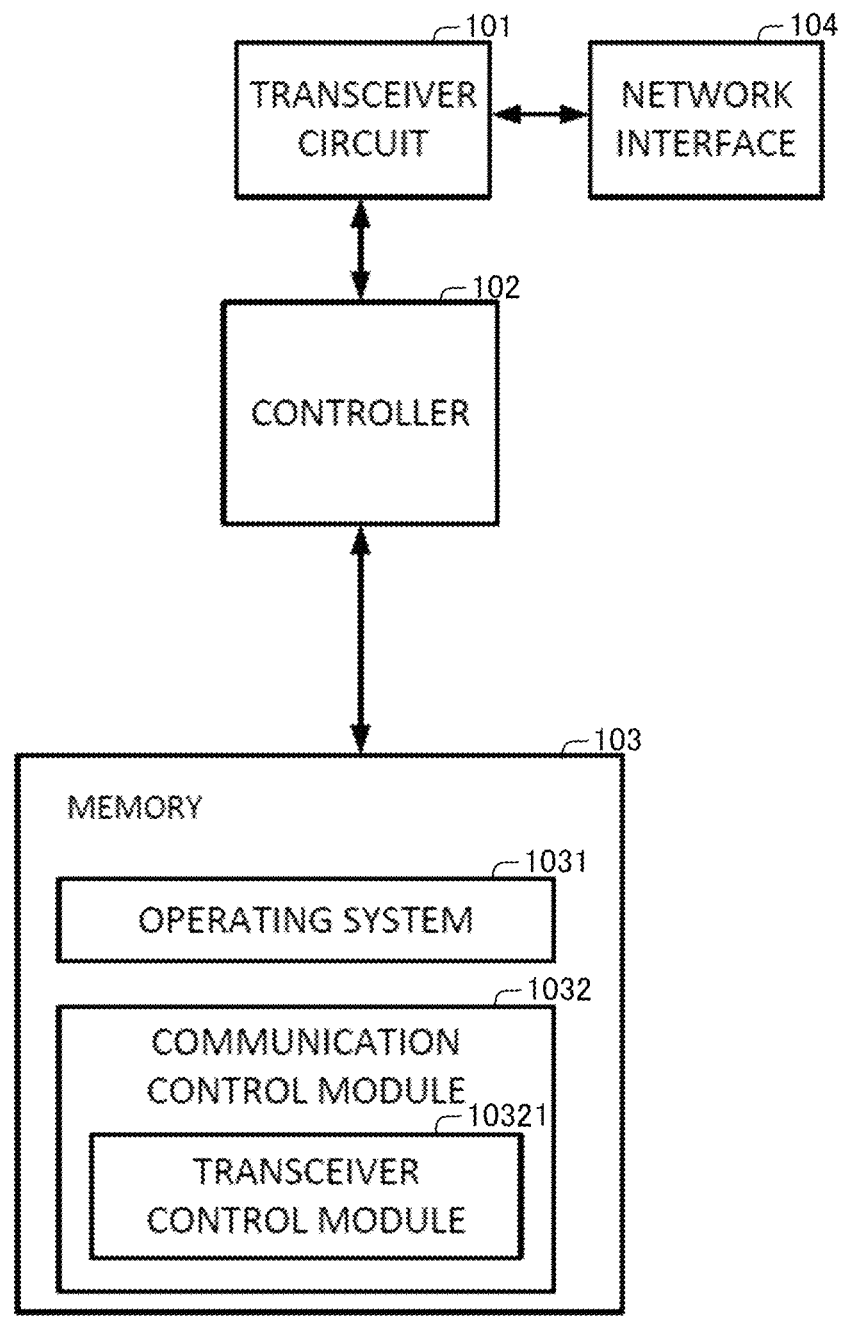

RRC INACTIVE STATE OPTIMIZATION

CROSS-REFERENCE TO RELATED PATENT APPLICATIONS

This application is a National Stage Entry of International Application No. PCT/JP2018/047874, filed Dec. 26, 2018, which claims priority from European Patent Application No. 18151514.9, filed Jan. 12, 2018. The entire contents of the above-referenced applications are expressly incorporated herein by reference.

TECHNICAL FIELD

The present disclosure relates to a communication system. The disclosure has particular but not exclusive relevance to wireless communication systems and devices thereof operating according to the 3rd Generation Partnership Project (3GPP) standards or equivalents or derivatives thereof. The disclosure has particular but not exclusive relevance to network slice privacy in the so-called 'Next Generation' systems.

BACKGROUND ART

3GPP Working Groups are working on a new feature called an RRC_INACTIVE state.

RRC_INACTIVE is a state where UE remains in CM-CONNECTED and can move within an area configured by NG-RAN called RNA (Ran Notification Area) without notifying NG-RAN (e.g. gNB). In RRC_INACTIVE, the last serving gNB node keeps a UE context and the UE-associated N2 connection with the serving AMF (Access and Mobility Management Function) and UPF (User Plane Function) (TS38.300). Abbreviations and Terminology are provided at the end of the present disclosure.

If the last serving gNB receives Down Link (DL) data from the UPF or DL signaling from the AMF while the UE is in RRC_INACTIVE, the last serving gNB pages in the cells corresponding to the RNA and may send XnAP RAN Paging to neighbor gNB(s) if the RNA includes cells of neighbor gNB(s).

At transition to RRC_INACTIVE, the NG-RAN node may configure the UE with a periodic RNA Update timer value. At periodic RNA Update timer expiry without notification from the UE, the gNB behaves as specified in 3GPP (TS 23.501).

If the UE accesses a gNB other than the last serving gNB, the receiving gNB triggers an XnAP Retrieve UE Context procedure to get the UE context from the last serving gNB and may also trigger a Data Forwarding procedure including tunnel information for potential recovery of data from the last serving gNB. Upon successful context retrieval, the receiving gNB becomes a serving gNB and further triggers an NGAP (NG Application Protocol) Path Switch Request procedure. After the path switch procedure, the serving gNB triggers release of the UE context at the last serving gNB by means of the XnAP UE Context Release procedure.

If the UE accesses a gNB other than the last serving gNB and the receiving gNB does not find a valid UE Context, the gNB performs establishment of a new RRC connection instead of resumption of the previous RRC connection.

UE in the RRC_INACTIVE state is required to initiate an RNA update procedure when the UE moves out of the configured RNA. When receiving an RNA update request from the UE, the receiving gNB may decide to send the UE back to the RRC_INACTIVE state, move the UE into the RRC_CONNECTED state, or send the UE to RRC_IDLE.

FIG. 1 illustrates the UE RRC state machine transitions in NR (TS38.331).

The RRC_INACTIVE state is part of an RRC state machine, and it is up to the RAN to determine the conditions to enter the RRC Inactive state.

The AMF, based on network configuration, may provide assistance information to the NG-RAN, to assist the NG-RAN's decision whether the UE can be sent to the RRC Inactive state (TS23.501). Currently the "RRC Inactive assistance information" includes:
 UE specific DRX values;
 the Registration Area provided to the UE;
 Periodic Registration Update timer;
 if the AMF has enabled MICO mode for the UE, an indication that the UE is in MICO mode; and
 information from the UE permanent identifier that allows the RAN to calculate the UE's RAN paging occasions.

The RRC Inactive assistance information mentioned above is provided by the AMF during N2 activation with the (new) serving NG-RAN node (i.e., during Registration, Service Request, handover) to assist the NG RAN's decision whether the UE can be sent to the RRC Inactive state.

The 5GC network is not aware of the UE transitions between CM-CONNECTED with RRC Connected and CM-CONNECTED with RRC Inactive state, unless the 5GC network is notified via an N2 notification procedure in TS 23.502 clause 4.8.3. This procedure is used by an AMF to request the NG-RAN to report RRC state information, when the target UE is in CM-CONNECTED state.

SUMMARY OF INVENTION

Technical Problem

Currently, the "RRC Inactive assistance information" from the AMF to gNB (TS23.501) includes:
 UE specific DRX (Discontinuous Reception) values;
 the Registration Area provided to the UE;
 Periodic Registration Update timer;
 if the AMF has enabled MICO (Mobile Originated Communication Only) mode for the UE, an indication that the UE is in MICO mode; and
 information from the UE permanent identifier that allows the RAN to calculate the UE's RAN paging occasions.

As the "RRC Inactive state" is a new feature, the above list of the RRC Inactive assistance information from the Core Network is not complete yet. This IPR explores the possible future improvements to the "RRC Inactive state" management, i.e., what new assistance information could be provided by the AMF to the gNB in order to improve/optimize the use of the RRC Inactive state by the gNB (NG RAN).

Solution to Problem

In order to achieve the object, a core network node as an aspect of the present disclosure includes a means for transmitting information related to expected mobility of user equipment, UE, to an access network node.

Further, an access network node as another aspect of the present disclosure includes a means for receiving information related to expected mobility of user equipment, UE, from a core network node for mobility management.

Further, in a mobility management method as another aspect of the present disclosure, a core network node transmits information related to expected mobility of user equipment, UE, to an access network node.

Further, in another mobility management method as another aspect of the present disclosure, an access network node receives information related to expected mobility of user equipment, UE, from a core network node for mobility management.

Further, a network system as another aspect of the present disclosure includes the core network node as the above aspect and the access network node as the above aspect.

Advantageous Effects of Invention

With the configurations as described above, the present disclosure can provide a core network node, an access network node, a mobility management method and a network system which enable improvement/optimization of the use of the RRC Inactive state by the gNB.

BRIEF DESCRIPTION OF DRAWINGS

FIG. 6 is a block diagram illustrating the main components of UE.

FIG. 7 is a block diagram illustrating the main components of a (R)AN.

FIG. 8 is a block diagram illustrating the main components of an AMF.

FIG. 9 is a block diagram illustrating the main components of a UDM/UDR.

DESCRIPTION OF ASPECTS

First Example Aspect

Solution 1—Further Assistance Information Provision for RRC Inactive State Optimization in gNB (NG RAN)

Figure 1:
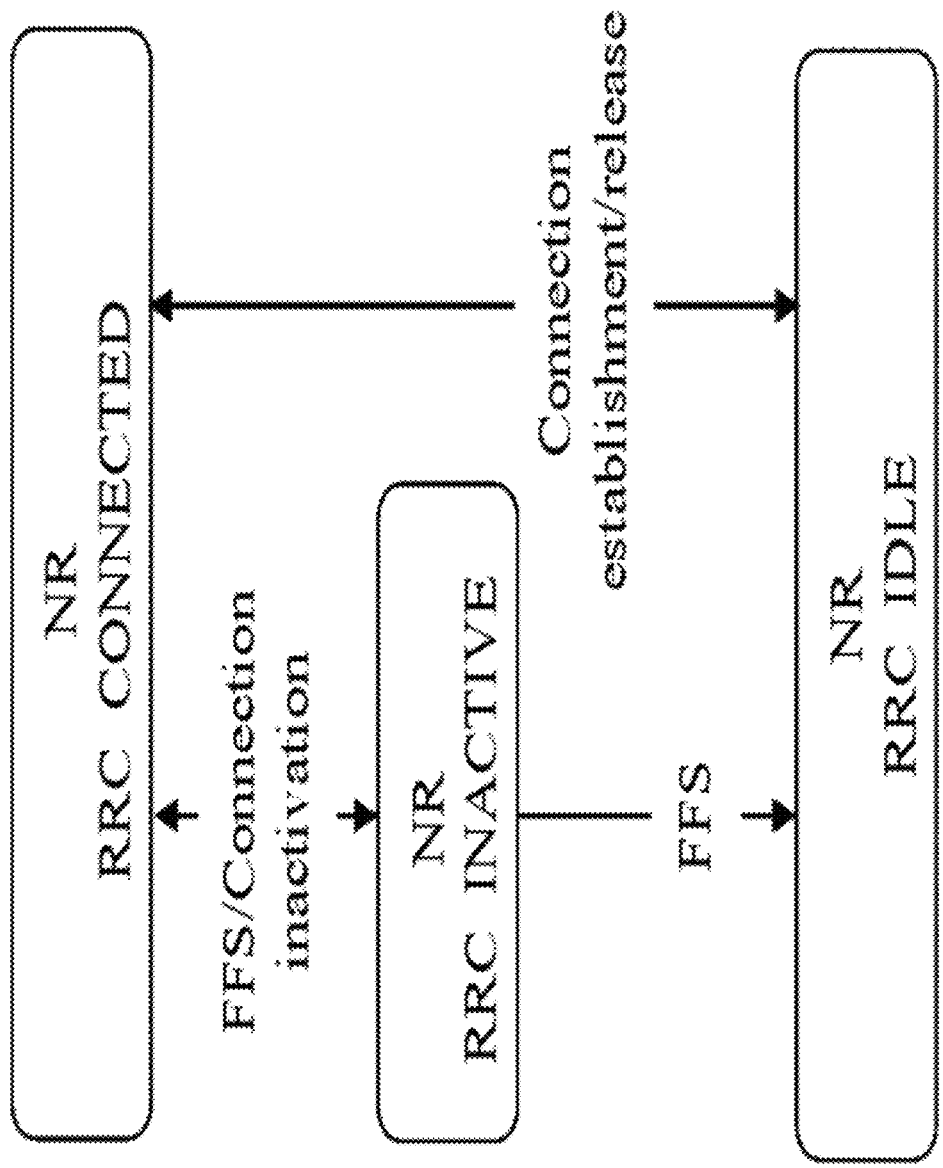
FIG. 1 illustrates UE RRC state machine transitions in NR.
Figure 2:
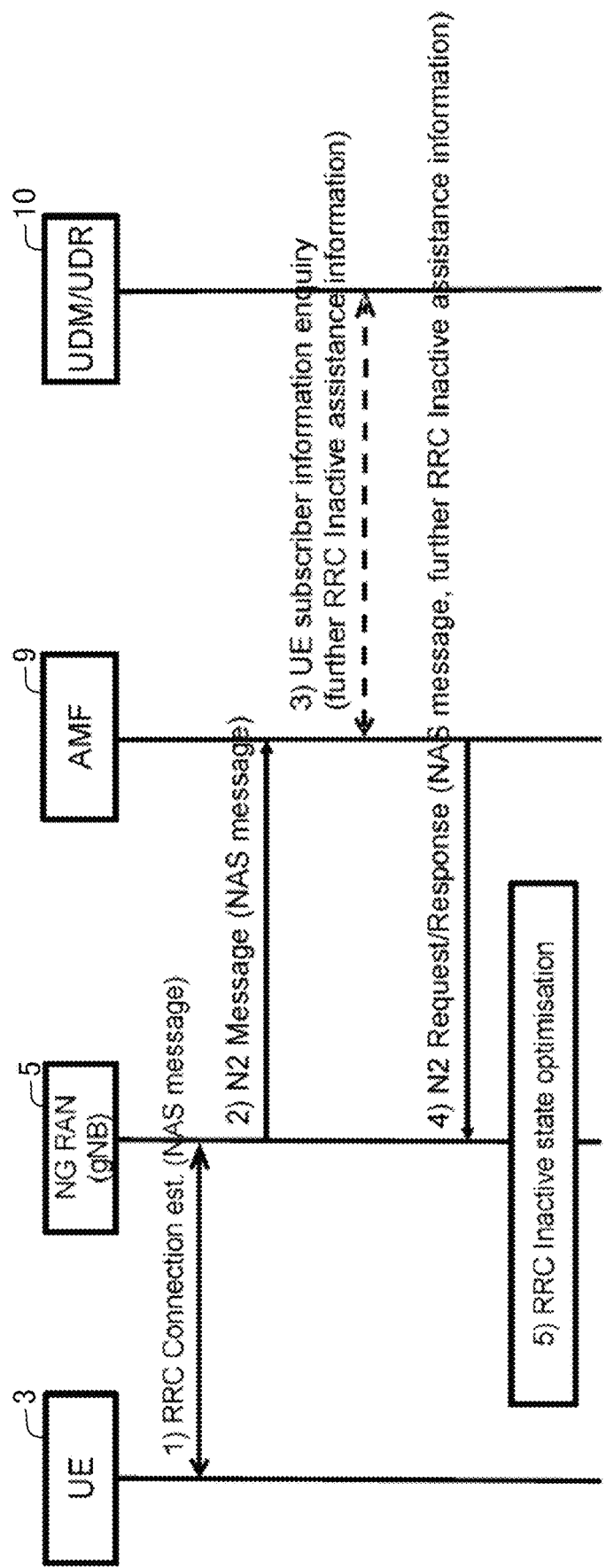
FIG. 2 is a sequence diagram illustrating RRC Inactive state assistance information provision to NG RAN Node.

Solution 1 proposes to introduce further RRC Inactive assistance information from a 5G Core Network (e.g. AMF) to the 5G RAN (e.g. gNB) in order for the NG RAN node to better control and optimize the RRC Inactive state transitions and RNA (Ran Notification Area) configuration. FIG. 2 demonstrates the further RRC Inactive assistance information provision to the gNB during UE registration or Service Request or Handover procedures.

In FIG. 2, the procedure shown is as follows:

1) RRC Connection Establishment procedure—the purpose of this procedure is to establish or resume an RRC connection. RRC connection establishment involves SRB1 establishment. The procedure is also used to transfer the initial NAS dedicated information message (e.g. Registration message, Service Request message or any other NAS message) from the UE 3 to the 5G Core Network 7 (e.g. AMF 9).

2) N2 Message from gNB 5 to AMF 9—the purpose of the N2 Message is to activate N2 connection and to convey the NAS message from the UE 3 to the AMF 9.

3) UE subscriber information inquiry—If the UE context is not available in the AMF 9 (e.g. during registration) or the UE context is not updated, the AMF 9 may retrieve the UE context from a UDM/UDR 10. The AMF 9 may retrieve Access and Mobility subscription data via Nudm_SDM_Get message or any other message for the subscriber information retrieval purpose. This requires that the UDM may retrieve this information from the UDR by Nudr_UDM_Query (Access and Mobility Subscription data). As part of the subscription data, the AMF 9 may retrieve subscriber information needed for RRC Inactive assistance (further RRC Inactive assistance information) such as the UE mobility status (e.g. stationary, low mobility, medium mobility or high mobility), expected UE moving trajectory, the UE power source information (battery powered or not), UE communication pattern information and other relevant subscriber information that is needed in the serving gNB 5 for RRC Inactive state transitions control/optimization and/or for optimal RNA configuration by the gNB 5. The AMF 9 may subscribe to be notified using Nudm_SDM_Subscribe (or any other message for the purpose of subscription) when the data requested is modified, the UDM may subscribe to the UDR by Nudr_UDM_Subscribe.

4) N2 Request/Response message from AMF 9 to gNB 5—the N2 Request/Response message completes the N2 connection establishment between the gNB 5 and the AMF 9 and may carry a NAS message (e.g. Service Accept message or any other NAS message). The AMF 9, based on network configuration and/or policy, may include further RRC Inactive assistance information to the gNB 5 (i.e., other than the already defined RRC Inactive assistance information in TS23.501, 5.3.3.2.5) such as UE mobility (e.g. stationary, low mobility, medium mobility or high mobility), expected UE moving trajectory, UE power source information (battery powered or not), no communication activity indication information, UE communication pattern information, UE communication type, RRC Inactive feature suspension indication information, Frequently paged UE indication information and any other assistance information that could help with the RRC Inactive state transitions optimization and/or with an optimal RNA configuration.

5) RRC Inactive state optimization—the extra RRC Inactive assistance information provided to the serving gNB 5 at step 4 with the N2 Request/Response message from the AMF 9 is used by the gNB 5 for optimization of the RRC Inactive state transitions and RNA (Ran Notification Area) configuration.

One proposal for a new 'further RRC Inactive assistance information' is as follows.

Option 1A: UE Mobility (e.g. Stationary UE, Low Mobility UE, Medium Mobility UE, High Mobility UE)

The UE mobility may assist the gNB 5 with its decision on whether to put the UE 3 in the RRC Inactive state or not. For example, if the UE 3 is stationary or low mobility, the RRC Inactive state could be beneficial as it would be easier to set an RNA (Ran Notification Area) where the UE 3 would reside for longer. If the UE 3 is (or becomes) high mobility, the gNB 5 may decide that it does not make sense to put the UE 3 in the RRC Inactive state as the UE 3 would be soon out of the RNA and thus there would be an increase of signaling instead of signaling reduction.

The UE mobility information may also benefit the RNA configuration by the gNB 5 when the gNB 5 decides to move the UE 3 in the RRC Inactive state. For example, if the UE mobility is stationary, the gNB 5 may configure an RNA for that UE 3 with few neighbor cells only where as if the UE 3 is moving, the size of the RNA may be configured proportionally to the UE mobility (e.g. a bigger RNA). Thus, the gNB 5 would be able to optimize the size of the RNA based on the UE mobility information and avoid the signaling due to UE 3 leaving the RNA.

In one alternative, the UE mobility may be provided via the NEF to the subscriber data in the UDM/UDR 10 (the UE stationary value is already available in the UDM/UDR 10) and the AMF 9 can retrieve the UE mobility information from the UE mobility parameters from the UDM/UDR 10 and can indicate the UE mobility information to the gNB 5 within the 'RRC Inactive assistance information' at N2 activation (see FIG. 2, step 4 (N2 Request/Response message) and/or step 3 (UE Subscriber information inquiry) or any other message between the AMF 9 and gNB 5 at N2 creation).

The AMF 9 may also provide within the 'RRC inactive assistance information' a 'validity time' related to the UE mobility, i.e., when the UE mobility status information expires and shall be deleted by the gNB 5. The validity time may also be set to indicate that the UE mobility status has no expiration time.

Figure 3:
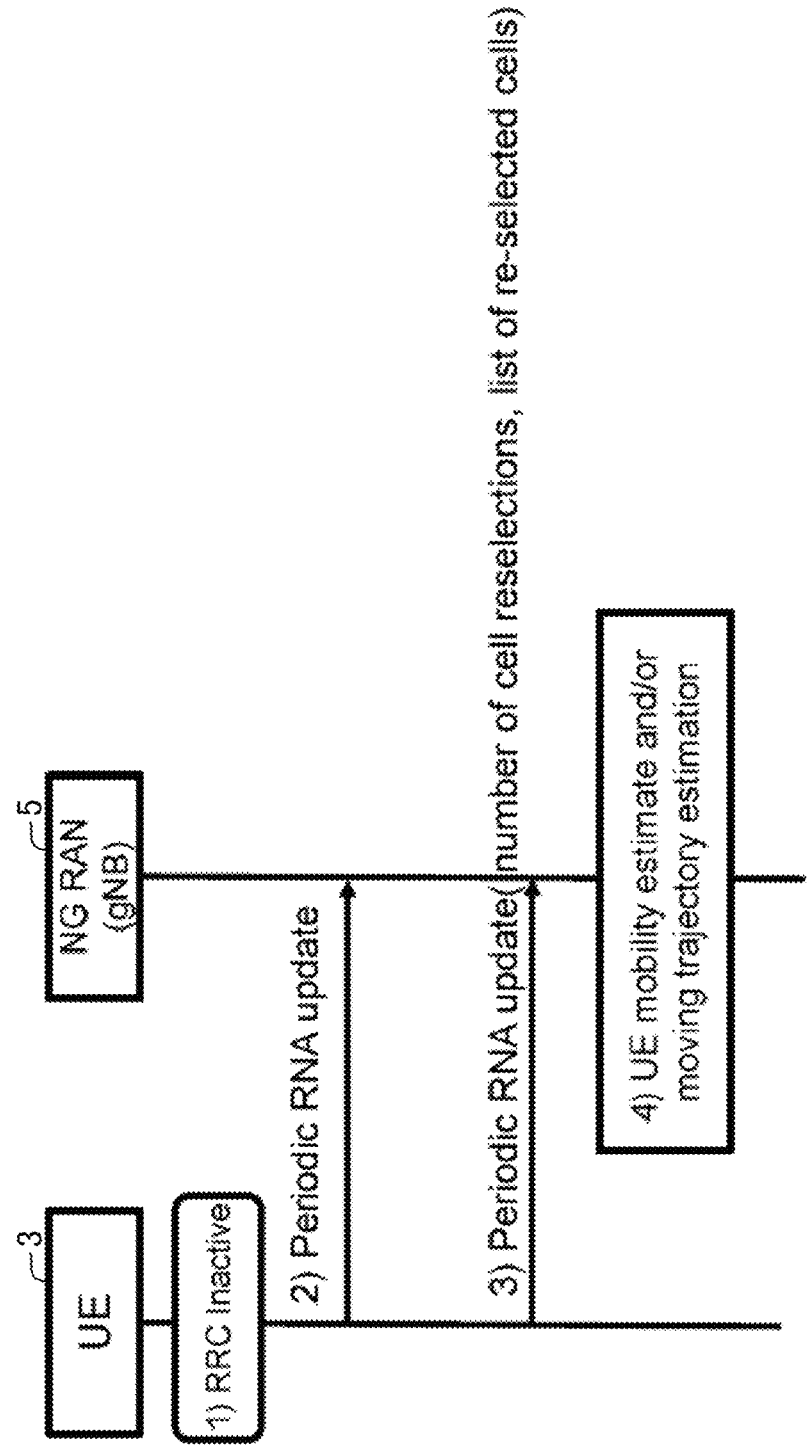
FIG. 3 is a sequence diagram illustrating dynamic update of a UE mobility status in a gNB.

In another alternative, the gNB 5 can be provided with up-to-date UE mobility information from the UE 3 itself. For example, the number of the cell re-selections by the UE 3 since the last connection (or for a defined time interval like the time interval between two consecutive RNA updates) could be relayed to the gNB 5 in RRC signaling (e.g. RNA periodic update or any other RRC message). FIG. 3 shows a use case where the UE mobility is provided to the gNB 5 within the periodic RNA update message in form of 'number of cell re-selections per defined time' (e.g. the time between two consecutive periodic RNA updates).

In FIG. 3, the UE mobility status update in the gNB 5 is demonstrated with the following steps:

1) The UE 3 is moved to the RRC Inactive state. At the UE 3 transition to the RRC Inactive state, the gNB 5 may configure the UE 3 with a periodic RNA Update timer value.

2) At expiry of the periodic RNA update timer, the UE 3 triggers a periodic RNA update message to the gNB 5.

3) At next periodic RNA update, the UE 3 may include in the RNA Update message the number of the cell re-selections since the last (i.e., previous) periodic RNA update and also the UE 3 may include in the RNA update message the list of the cells the UE 3 re-selected to (e.g. in order of reselection) since the previous RNA Update.

4) The gNB 5 may use the provided information (the number of cell re-selections and the list of the cells the UE 3 re-selected to since the previous RNA update in order to assess (or estimate) the UE mobility; stationary, low mobility, medium mobility or high mobility. The gNB 5 may use the UE mobility information in deciding whether the RRC Inactive state would be beneficial for the UE 3 (e.g. whether to move the UE 3 to the RRC Inactive state or not, whether to keep the UE 3 in the RRC Inactive state or move the UE 3 back to the RRC Idle state).

This alternative could be very beneficial for a use case where the UE mobility changes dynamically, like with cargo tracking devices where the mobility status of the device changes dynamically from stationary to medium or fast moving. It is for the network operator and/or the service provider to define the criteria for deciding whether the mobility is stationary, low, medium or fast.

Another proposal for a new 'further RRC Inactive assistance information' is as follows.

Option 1B: Expected UE Behavior Parameter (e.g. Expected UE Moving Trajectory)

The Expected UE behavior parameter (e.g. Expected UE moving trajectory) identifies the UE's expected geographical movement. This parameter may be provided to the 3GPP system via the NEF to be stored as part of the subscriber data in the UDM/UDR 10. The Expected UE behavior parameter (e.g. Expected UE moving trajectory) may have an associating validity time.

In one alternative, the AMF 9 may retrieve the Expected UE behavior parameter (e.g. expected UE moving trajectory) from the subscriber data (in the UDM/UDR 10) and provide it to the gNB 5 at the N2 activation within the 'RRC Inactive assistance information' (see FIG. 2, step 4 (N2 Request/Response message) and/or step 3 (UE Subscriber information inquiry)).

The expected UE moving trajectory parameter may be defined in a format of:
  a list of waypoints (e.g. longitude and latitude); or
  a list of cells that cover (i.e., overlap with) the expected UE moving trajectory. The mapping between the UE 3 expected moving trajectory and the cells that cover the trajectory could be done in the core network 7 (e.g. AMF 9 or UDM/UDR 10) in which case the AMF 9 would provide the gNB 5 with a list of cells that overlap with the UE moving trajectory, or alternatively, the mapping could be done in the gNB 5 itself in which case the AMF 9 provides the UE moving trajectory without mapping it to cells, or
  in any other format convenient for processing by the gNB 5.

The gNB 5 may use the expected UE moving trajectory information in deciding whether to put the UE 3 in the RRC Inactive state and if so, the gNB 5 may use the expected UE moving trajectory in configuring the most optimal RNA (Ran Notification Area) for that UE 3.

The AMF 9 may also provide in the 'RRC inactive assistance information' a 'validity time' related to the 'Expected UE behavior parameter' i.e., when the Expected UE behavior parameter (e.g. expected UE moving trajectory) expires and shall be deleted by the gNB 5. The validity time may be set to indicate that the particular Expected UE behavior parameter has no expiration time.

In another alternative, the UE moving trajectory can be deducted by the gNB 5 via analyzing the list of cells the UE 3 reselects to within the Periodic RNA update message, see FIG. 3, step 3 (Periodic RNA update message). If such a list is provided by the UE 3 and the cells in the list are ordered in the sequence of re-selecting them, the gNB 5 can create a moving trajectory map from the list and can use this moving trajectory map and the list of the cells from which the moving trajectory map was deducted, to configure the RNA for that UE 3 in RRC Inactive state.

Yet another proposal for a new 'further RRC Inactive assistance information' is as follows.

Option 1C: Battery Powered UE Indication

The AMF 9 may provide to the gNB 5 within the further RRC Inactive assistance information (FIG. 2, step 4 (N2 Request/Response message) and/or step 3 (UE Subscriber information inquiry)) information that the UE 3 is battery powered. The AMF 9 may retrieve the battery powered UE indication information from the subscriber data in the UDM/UDR 10. The battery powered UE indication information indicates that the UE 3 is battery powered and has no main power as a back-up or for re-charge. The gNB 5 may use the information that the UE 3 is battery powered in deciding on whether to move the UE 3 to the RRC Inactive state. In some circumstances, if the UE 3 is battery powered UE, the gNB 5 may decide to move the UE 3 in the RRC Idle state instead of the RRC Inactive state in order to save the battery power of the UE 3.

Yet another proposal for a new 'further RRC Inactive assistance information' is as follows.

Option 1D: No Communication Activity Indication

There could be a situation when the AMF 9 is aware that there is no expected MO (Mobile Originated) and MT (Mobile Terminated) activity for a defined time interval. For example, the AMF 9 may be aware that the UE 3 is allowed only to communicate and be communicated to at specific times or time intervals, i.e., outside of these time intervals the UE 3 shall not be active. In this case, the AMF 9 may indicate within the further RRC Inactive assistance information (FIG. 2, step 4 (N2 Request/Response message)) 'No communication activity indication' information (or any other name for indication of no activity) to the gNB 5, and the AMF 9 may also provide in the same 'RRC inactive assistance information' a 'validity time' related to the 'No communication activity indication' information i.e., when the validity time related to the 'No communication activity indication' information expires, the gNB 5 shall delete the 'No communication activity indication' information.

The gNB 5 may use the 'No communication activity indication' information when deciding whether to put the UE 3 in the RRC Inactive state or not. For example, if there is no communication expected for a long time interval, the gNB 5 may decide to move the UE 3 in the RRC Idle rather than in the RRC Inactive state.

Yet another proposal for a new 'further RRC Inactive assistance information' is as follows.

Option 1E: UE Communication Pattern Information

The AMF 9 may provide to the gNB 5 within the further 'RRC Inactive assistance information' (FIG. 2, step 4 (N2 Request/Response message) and/or step 3 (UE Subscriber information inquiry)) UE communication pattern information about the UE 3. The AMF 9 may retrieve the UE communication pattern information from the subscriber data in the UDM/UDR 10. The UE communication pattern information may identify:

whether the UE communicates periodically or on demand;
a time interval between the communication occasions (if periodic communication);
scheduled communication timeslots; and
any other type of communication.

The gNB 5 may use the UE communication pattern information in deciding on whether and/or when to move the UE 3 to the RRC Inactive state.

The AMF 9 may also provide in the same 'RRC inactive assistance information' to the gNB 5 a 'validity time' related to the 'UE Communication pattern information,' i.e., when the validity time related to the 'UE Communication pattern information' expires, the gNB 5 shall delete the 'UE communication pattern information.' The validity time may be set to indicate that the particular Expected UE behavior parameter has no expiration time.

Yet another proposal for a new 'further RRC Inactive assistance information' is as follows.

Option 1F: UE Communication Type (e.g. Application Type)

The AMF 9 may provide to the gNB 5 within the further RRC Inactive assistance information (FIG. 2, step 4 (N2 Request/Response message) and/or step 3 (UE Subscriber information inquiry)) information of a communication type (for example, an application type such as which application is active, a device type such as a CIoT device and a URLLC device, and so on). If the UE 3 supports different applications for communication, it is possible that only certain application(s) require quick transition from RRC Idle to RRC Connected. For such communication types (e.g. applications), the gNB 5 may consider the type of the communication (e.g. whether the active application requires the use of the RRC Inactive state) in deciding whether to put the UE 3 in the RRC Inactive state or not.

Yet another proposal for a new 'further RRC Inactive assistance information' is as follows.

Option 1G: RRC Inactive Feature Suspension Indication

The AMF 9 may provide to the gNB 5 within the 'further RRC Inactive assistance information' (FIG. 2, step 4 (N2 Request/Response message) and/or step 3 (UE Subscriber information inquiry)) an indication suggesting the RRC Inactive feature to be temporarily suspended. The AMF 9 may also provide in the same 'RRC inactive assistance information' to the gNB 5 a 'validity time' related to the 'RRC Inactive state feature suspension indication' information.

When the gNB 5 receives within the 'RRC Inactive assistance information' an 'RRC Inactive feature suspension indication' information, the gNB 5 may suspend (disable or disallow the RRC Inactive state feature for the duration of the validity time). When the validity time related to the 'RRC Inactive state feature suspension indication' information expires, the gNB 5 shall delete the 'RRC Inactive state feature suspension indication' information (i.e., the RRC Inactive state feature suspension should be lifted). The validity time may be set to indicate that the particular Expected UE behavior parameter has no expiration time.

The AMF 9 may provide such RRC Inactive assistance information (e.g. RRC Inactive state feature suspension) based on operator's policy and configuration in the Core Network 7 (e.g. AMF 9).

Option 1H: Frequently Paged UE Indication

The AMF 9 may provide to the gNB 5 within the 'further RRC Inactive assistance information' (FIG. 2, step 4 (N2 Request/Response message) and/or step 3 (UE Subscriber information inquiry)) an indication that the connecting UE 3 is a frequently paged UE. The AMF 9 may also provide in the same 'RRC inactive assistance information' to the gNB 5 a 'validity time' related to the 'Frequently paged UE indication' information in order to further define a time interval at which the UE 3 is likely to be paged frequently.

When the gNB 5 receives within the 'RRC Inactive assistance information' a 'Frequently paged UE indication' information, the gNB 5 may use the 'Frequently paged UE indication' information in deciding on whether and/or when to move the UE 3 to the RRC Inactive state. For example, if the UE 3 is paged frequently and/or the UE 3 is a medium or high mobility UE, the gNB 5 may decide not to put the UE 3 in the RRC Inactive state in order to avoid an increase in control plane signaling due to higher probability for paging failures in case the UE 3 was put in the RRC Inactive state and the UE 3 was paged within the RAN (Ran Notification Area). Any UE paging failure while the UE 3 is in the RRC Inactive state would force the UE 3 and the gNB 5 to fall back to the RRC Idle state and switch back from paging in RNA to the conventional Core Network 7 (AMF 9) paging. This would create extra control plane signaling that would nullify the benefits for the UE 3 from being in the RRC Inactive state.

That is why, if the gNB 5 receives within the 'RRC Inactive assistance information' a 'Frequently paged UE indication' information, the gNB 5 may decide to put the UE 3 in the RRC Idle state instead of the RRC Inactive state so that the UE 3 is paged from the CN 7 (e.g. AMF 9) and thus avoid the possible paging failures if the UE 3 was put in the RRC Inactive state and was paged within the RNA (Ran Notification Area).

Solution 2—RRC Inactive State Support Indication at N2 Activation

Figure 4:
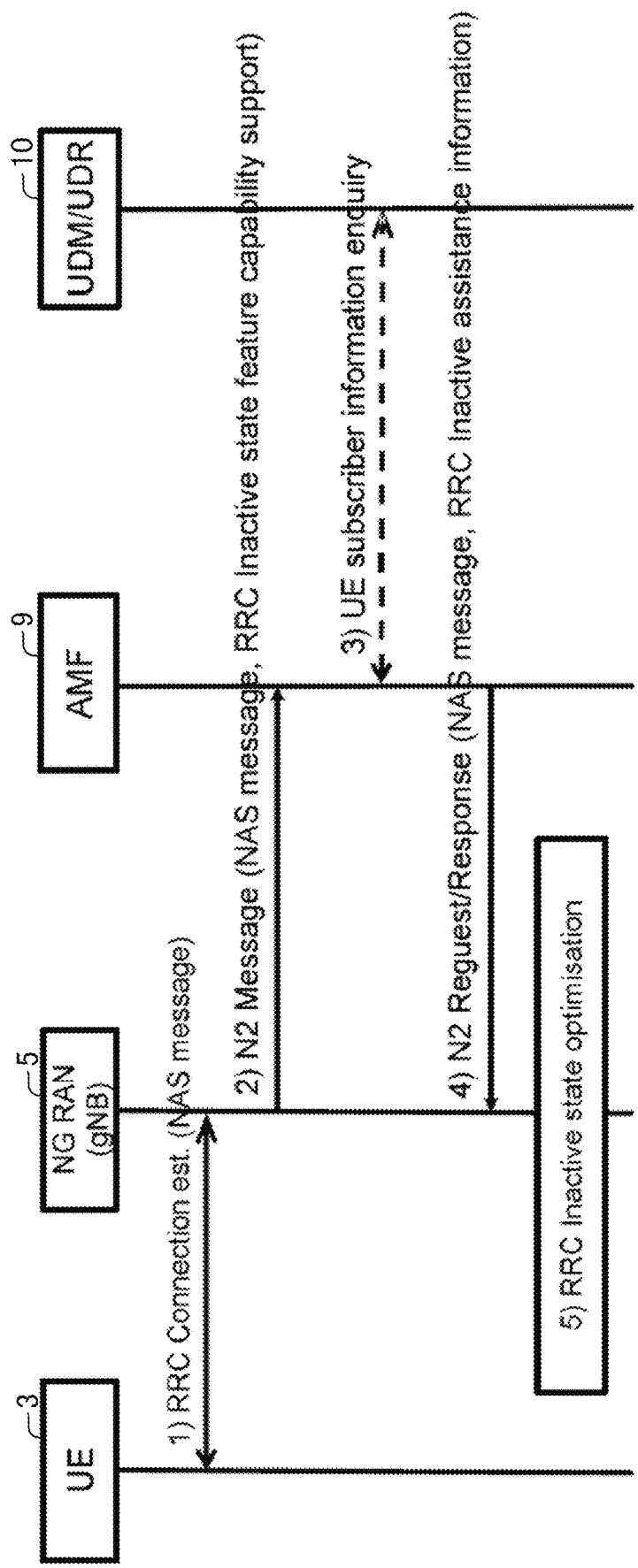
FIG. 4 is a sequence diagram illustrating RRC Inactive state support indication at N2 activation.

TS23.501 in clause 5.3.3.2.5 suggests that 'RRC Inactive assistance information' is provided by the AMF 9 during N2 activation with the serving gNB 5 (i.e., during Registration, Service Request and handover) to assist the gNB's decision whether the UE 3 can be sent to the RRC Inactive state. However, the provision of the RRC Inactive assistance information from the AMF 9 to the gNB 5 is beneficial only when both the UE 3 and the gNB 5 support the RRC Inactive state feature. That is why Solution 2 proposes that the RRC Inactive assistance information from the Core Network 7 (e.g. AMF 9) is provided to the serving gNB 5 at N2 activation only when both the connecting UE 3 and the serving gNB 5 support the RRC Inactive state feature/capability. For this, it is proposed that at N2 activation the gNB 5 indicates to the AMF 9 on whether the RRC Inactive state is supported by the UE 3 and/or the gNB 5 (see FIG. 4).

1) RRC Connection Establishment procedure. The procedure is also used to transfer an initial NAS dedicated information message (e.g. a Registration message, a Service Request message or any other NAS message) from the UE 3 to the 5G Core Network 7 (e.g. the AMF 9).

2) N2 Message from gNB 5 to AMF 9. The purpose of an N2 Message is to activate N2 connection and to convey the NAS message from the UE 3 to the AMF 9. The gNB 5 may also include an indication on whether the RRC Inactive state feature/capability is supported by the serving gNB 5 and/or the UE 3:

In one alternative (Alt. 2A), the gNB 5 may include an RRC Inactive state feature/capability support indication (or set it ON/True) when both the gNB 5 and the UE 3 support the RRC Inactive state feature/capability;

In another alternative (Alt. 2B) the gNB 5 may include the RRC Inactive state/feature support indication (or set it ON/True) based on the support of the RRC Inactive state feature/capability by the gNB 5 only.

In another alternative (Alt. 2C), the gNB 5 may include the RRC Inactive state/feature support indication (or set it ON/True) based on the support of the RRC Inactive state feature/capability by the UE 3 only.

3) UE subscriber information inquiry. If the UE context is not available in the AMF 9 (e.g. during registration) or the UE context is not updated, the AMF 9 may retrieve the UE context from the UDM/UDR 10.

4) N2 Request/Response message from AMF 9 to gNB 5. An N2 Request/Response message completes the N2 connection establishment between the gNB 5 and the AMF 9 and may carry a NAS message (e.g. a Service Accept message or any other NAS message).

If the gNB 5 has indicated in the N2 message:

(alt. 2A) both the gNB 5 and the UE 3 support the RRC Inactive state feature/capability, the AMF 9 may include in the N2 Request/Response message to the gNB 5 the RRC Inactive assistance information, otherwise the AMF 9 may not include the RRC Inactive assistance information;

(alt. 2B) the gNB 5 supports the RRC Inactive state feature/capability, in which case if the AMF 9 is aware that the connecting UE 3 also supports the RRC Inactive state feature/capability (e.g. the indication that the UE 3 supports for the RRC Inactive state feature/capability was indicated to the AMF 9 directly in a NAS message or the indication was retrieved from the subscriber information in the UDM/UDR 10), the AMF 9 may include in the N2 Request/Response message to the gNB 5 the RRC Inactive assistance information, otherwise the AMF 9 may not include the RRC Inactive assistance information;

(alt. 2C) the UE 3 supports the RRC Inactive state feature/capability, in which case if the AMF 9 is aware that the gNB 5 also supports the RRC Inactive state feature/capability (e.g. the indication that the gNB 5 supports for the RRC Inactive state feature/capability was indicated to the AMF 9 previously), the AMF 9 may include in the N2 Request/Response message to the gNB 5 the RRC Inactive assistance information, otherwise the AMF 9 may not include the RRC Inactive assistance information.

5) RRC Inactive state optimization. If the RRC Inactive assistance information was provided by the AMF 9 in FIG. 4, step 4, the gNB 5 uses the RRC Inactive assistance information for optimization of the RRC Inactive state transitions and RNA (Ran Notification Area) configuration.

Note: All the 5G solution proposals in this patent application are equally applicable to 4G where instead of the AMF 9, we have MME, SCEF for NEF, HSS for UDM/UDR 10, S1-AP connection for N2 connection and eNB for gNB 5.

Beneficially, the above-described exemplary aspects include, although they are not limited to, one or more of the following functionalities.

Solution 1

1) UE mobility information (e.g. stationary, low mobile, medium mobile, high mobile) provision to the gNB 5 by the AMF 9 within the further RRC Inactive assistance information so that the gNB 5 can optimize the RRC Inactive state transitions and RNA (Ran Notification Area) configuration. The AMF 9 may also provide a validity time parameter for the UE mobility information.

2) Expected UE behavior parameter (e.g. expected UE moving trajectory) information provision to the gNB 5 by the AMF 9 within the further RRC Inactive assistance information so that the gNB 5 can optimize the RRC Inactive state transitions and RNA (Ran Notification Area) configuration. The AMF 9 may also provide a validity time parameter for the expected UE behavior parameter.

3) Battery powered UE indication information provision to the gNB 5 by the AMF 9 within the further RRC Inactive assistance information so that the gNB 5 can optimize the RRC Inactive state transitions.

4) No communication activity indication information provision to the gNB 5 by the AMF 9 within the further RRC Inactive assistance information so that the gNB 5 can optimize the RRC Inactive state transitions and RNA (Ran Notification Area) configuration. The AMF 9 may also provide a validity time parameter for the No communication activity indication parameter.

5) UE communication pattern information provision to the gNB 5 by the AMF 9 within the further RRC Inactive assistance information so that the gNB 5 can optimize the RRC Inactive state transitions and RNA (Ran Notification Area) configuration. The AMF 9 may also provide a validity time parameter for the UE communication pattern information.

6) UE communication type (e.g. application type) information provision to the gNB 5 by the AMF 9 within the further RRC Inactive assistance information so that the gNB 5 can optimize the RRC Inactive state transitions.

7) 'RRC Inactive state feature suspension indication' information provision to the gNB 5 by the AMF 9 within the further RRC Inactive assistance information so that the gNB 5 can optimize the RRC Inactive state transitions and RNA (Ran Notification Area) configuration. The AMF 9 may also provide a validity time parameter for the 'RRC Inactive state feature suspension indication.'

8) Frequently paged UE indication information provision to the gNB 5 by the AMF 9 within the further RRC Inactive assistance information so that the gNB 5 can optimize the RRC Inactive state transitions and RNA (Ran Notification Area) configuration. The AMF 9 may also provide a validity time parameter for the Frequently paged UE indication information.

Solution 2

1) At N2 activation, the gNB 5 may include indication to the AMF 9 on whether the RRC Inactive state feature/capability is supported by the serving gNB 5 and/or the UE 3:

In one alternative (alt. 2A), the gNB 5 may include the RRC Inactive state feature/capability indication when both the gNB 5 and the UE 3 support the RRC Inactive state feature capability;

In another alternative (alt. 2B), the gNB 5 may include the RRC Inactive state feature/capability support indication based on the support by the gNB 5 only;

In another alternative (alt. 2C), the gNB 5 may include the RRC Inactive state feature/capability support indication based on the support by the UE 3 only. 2) If the gNB 5 has indicated in the N2 message:

(alt. 2A) both the gNB 5 and the UE 3 support RRC Inactive state feature/capability, the AMF 9 may include in the N2 Request/Response message to the gNB 5 the RRC Inactive assistance information;

(alt. 2B) the gNB 5 supports the RRC Inactive state feature/capability, in which case if the AMF 9 is aware that the UE 3 also supports RRC Inactive state feature/capability (e.g. the indication that the UE3 supports for the RRC Inactive state feature/capability was indicated to the AMF 9 directly in a NAS message or the indication was retrieved from the subscriber information in the UDM/UDR 10), the AMF 9 may include in the N2 Request/Response message to the gNB 5 the RRC Inactive assistance information, otherwise the AMF 9 may not include the RRC Inactive assistance information;

(alt. 2C) the UE 3 supports the RRC Inactive state feature/capability, in which case if the AMF 9 is aware that the gNB 5 also supports the RRC Inactive state feature/capability (e.g. the indication that the gNB 5 supports for the RRC Inactive state feature/capability was indicated to the AMF 9 previously), the AMF 9 may include in the N2 Request/Response message to the gNB 5 the RRC Inactive assistance information, otherwise the AMF 9 may not include the RRC Inactive assistance information.

Summary

In summary, it can be seen that there are described methods and apparatus in which:

1) At N2 activation, the gNB 5 may include indication to AMF 9 on whether the RRC Inactive state feature/capability is supported by the serving gNB 5 and/or the UE 3;

2) If both the connecting UE 3 and the serving gNB 5 support the RRC Inactive state feature/capability, the AMF 9 may provide in the N2 Request/Response message to the gNB 5 the following further RRC Inactive assistance information:

UE mobility information (e.g. stationary, low mobile, medium mobile, high mobile)—the AMF 9 may also provide a validity time parameter for the UE mobility information;

Expected UE behavior parameter (e.g. expected UE moving trajectory) information—the AMF 9 may also provide a validity time parameter for the expected UE behavior parameter;

Battery powered UE indication information;

No communication activity indication information—the AMF 9 may also provide a validity time parameter for the No communication activity indication parameter;

UE communication pattern information—the AMF 9 may also provide a validity time parameter for the UE communication pattern information;

UE communication type (e.g. application type) information;

'RRC Inactive state feature suspension indication' information—the AMF 9 may also provide a validity time parameter for the 'RRC Inactive state feature suspension indication';

Frequently paged UE indication information—the AMF 9 may also provide a validity time parameter for the Frequently paged UE indication information.

Benefits

It can be seen that the above aspects beneficially provide a number of benefits, including (but not limited to) the following.

The proposed solution for further RRC Inactive assistance information provision from the AMF 9 to the gNB 5 at N2 activation, such as UE Mobility, UE moving trajectory, UE battery powered indication, No communication activity indication, UE communication pattern indication, UE communication type (e.g. active application) indication, RRC Inactivity feature/capability suspension indication and accompanying validity time may help the gNB 5 to optimize the RRC Inactive state feature state transitions and also help to configure an RNA (Ran Notification Area) while in the RRC Inactive state.

System Overview

Figure 5:
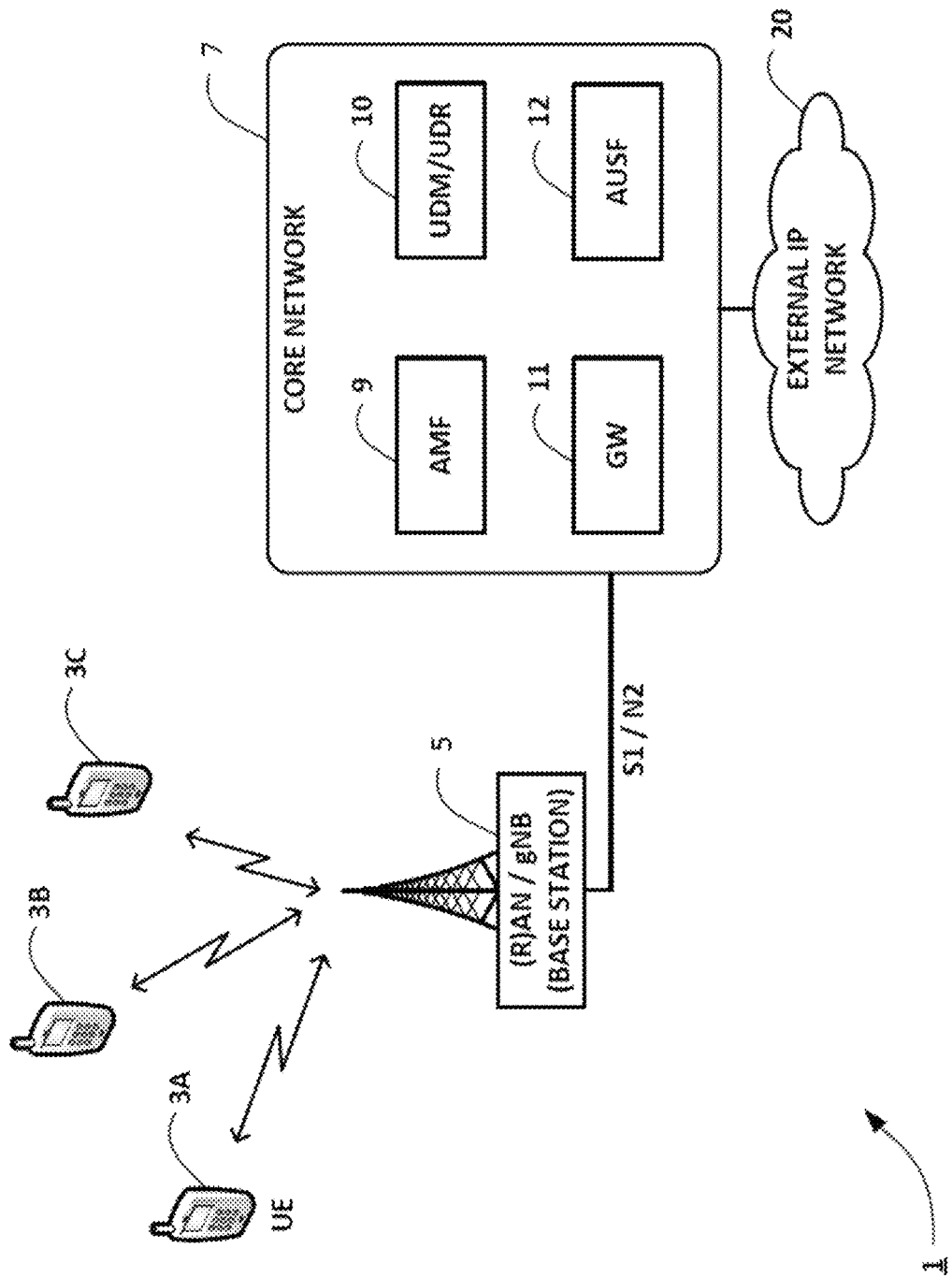
FIG. 5 schematically illustrates a mobile (cellular or wireless) telecommunication system.

FIG. 5 schematically illustrates a mobile (cellular or wireless) telecommunication system 1 to which the above aspects are applicable.

In this network, users of user equipment (UE) 3 (such as mobile devices 3A to 3C) can communicate with each other and other users via respective base stations 5 and a core network 7 using an E-UTRA and/or 5G radio access technology (RAT). It will be appreciated that a number of base stations (or 'gNBs' in 5G networks) form a (radio) access network. As those skilled in the art will appreciate, whilst three UEs 3 and one base station 5 are shown in FIG. 5 for illustration purposes, the system, when implemented, will typically include other base stations and UEs 3.

The core network 7 typically includes logical nodes (or 'functions') for supporting communication in the telecommunication system 1. Typically, for example, the core network 7 of a 'Next Generation'/5G system will include, amongst other functions, control plane functions and user plane functions.

As is well known, a UE 3 may enter and leave the areas (i.e., radio cells) served by the base stations 5 or the (R)AN as the UE 3 is moving around in the geographical area covered by the telecommunication system 1. In order to keep track of the UE 3 and to facilitate movement between the different base stations 5, the core network 7 comprises at least one access and mobility management function (AMF) 9. The AMF 9 is in communication with the base station 5 coupled to the core network 7. In some core networks, a mobility management entity (MME) may be used instead of the AMF 9.

The core network 7 also includes a user data management/unified data repository (UDM/UDR) node 10, one or more gateways 11, and an authentication and security function (AUSF) 12. Although not shown in FIG. 5, the core network 7 may also include further nodes, for example, a home subscriber server (HSS) and/or the like.

The UEs 3 and their respective serving base stations 5 are connected via an appropriate air interface (for example, a so-called "Uu" interface and/or the like). Neighboring base stations 5 are connected to each other via an appropriate base station to a base station interface (for example, a so-called "X2" interface and/or the like). The base station 5 is also connected to the core network nodes (such as the AMF 9 and the gateway 11) via an appropriate interface (for example, a so-called "S1" or "N2" interface and/or the like). From the core network 7, connection to an external IP network 20 (such as the Internet) is also provided.

User Equipment (UE) 3

FIG. 6 is a block diagram illustrating the main components of the UE 3. As shown, the UE 3 includes a transceiver circuit 31 which is operable to transmit signals to and to receive signals from the connected node(s) via one or more antenna 32. Although not necessarily shown in FIG. 6, the UE 3 will of course have all the usual functionality of a conventional mobile device (such as a user interface 35) and this may be provided by any one or any combination of hardware, software and firmware, as appropriate. Software may be pre-installed in the memory 34 and/or may be downloaded via the telecommunication network or from a removable data storage device (RMD), for example.

A controller 33 controls the operation of the UE 3 in accordance with software stored in a memory 34. The software includes, among other things, an operating system 341 and a communications control module 342 having at least a transceiver control module 3421. The communications control module 342 (using its transceiver control module 3421) is responsible for handling (generating/sending/receiving) signaling and uplink/downlink data packets between the UE 3 and other nodes, such as the base station/(R)AN node 5, the AMF 9 (and other core network nodes). Such signaling may include, for example, appropriately formatted signaling messages relating to connection establishment and maintenance (e.g. RRC connection establishment and other RRC messages), periodic location update related messages (e.g. tracking area update, paging area update, location area update, RAN notification area (RNA) update), and so on.

(R)AN Node 5

FIG. 7 is a block diagram illustrating the main components of an exemplary (R)AN node 5, for example, a base station ('gNB' in 5G). As shown, the (R)AN node 5 includes a transceiver circuit 51 which is operable to transmit signals to and to receive signals from connected UE(s) 3 via one or more antenna 52 and to transmit signals to and to receive signals from other network nodes (either directly or indirectly) via a network interface 55. A controller 53 controls the operation of the (R)AN node 5 in accordance with software stored in a memory 54. Software may be pre-installed in the memory 54 and/or may be downloaded via the telecommunication network or from a removable data storage device (RMD), for example. The software includes, among other things, an operating system 541 and a communications control module 542 having at least a transceiver control module 5421.

The communications control module 542 (using its transceiver control module 5421) is responsible for handling (generating/sending/receiving) signaling between the (R)AN node 5 and other nodes, such as the UE 3, the AMF 9, and the UDM/UDR 10 (e.g. directly or indirectly). The signaling may include, for example, appropriately formatted signaling messages relating to radio connection and location procedures (for a particular UE 3), and in particular, relating to connection establishment and maintenance (e.g. RRC connection establishment and other RRC messages), periodic location update related messages (e.g. tracking area update, paging area update, location area update, RAN notification area (RNA) update), N2 messaging (e.g. to activate an N2 connection, to convey an NAS message from the UE 3, to provide any RRC Inactive state feature capability support information to the AMF 9, and related N2 request/response messages from the core network 7), and so on.

The controller 53 is also configured (by software or hardware) to handle related tasks such as, when implemented, RRC Inactive state optimization, UE mobility estimate and/or moving trajectory estimation.

AMF 9

FIG. 8 is a block diagram illustrating the main components of the AMF, 9. As shown, the AMF 9 includes a transceiver circuit 91 which is operable to transmit signals to and to receive signals from other nodes (including the UE 3) via a network interface. A controller 92 controls the operation of the AMF 9 in accordance with software stored in a memory 93. Software may be pre-installed in the memory 93 and/or may be downloaded via the telecommunication network or from a removable data storage device (RMD), for example. The software includes, among other things, an operating system 931 and a communications control module 932 having at least a transceiver control module 9321.

The communications control module 932 (using its transceiver control module 9321) is responsible for handling (generating/sending/receiving) signaling between the AMF 9 and other nodes, such as the UE 3, base station/(R)AN node 5, and UDM/UDR 10 (directly or indirectly). Such signaling may include, for example, appropriately formatted signaling messages relating to the procedures described herein, for example, N2 messaging (e.g. from the (R)AN to activate an N2 connection, to convey an NAS message from the UE 3, and to provide any RRC Inactive state feature capability support information to the AM, and related N2 request/response messages to the (R)AN to provide, if implemented, (further) RRC Inactive assistance information), signaling messages relating to UE subscription inquiries, and so on.

UDM/UDR 10

FIG. 9 is a block diagram illustrating the main components of the UDM/UDR 10. As shown, the UDM/UDR 10 includes a transceiver circuit 101 which is operable to transmit signals to and to receive signals from other nodes (including the UE 3) via a network interface 104. A controller 102 controls the operation of the UDM/UDR 10 in accordance with software stored in a memory 103. Software may be pre-installed in the memory 103 and/or may be downloaded via the telecommunication network or from a removable data storage device (RMD), for example. The software includes, among other things, an operating system 1031 and a communications control module 1032 having at least a transceiver control module 10321.

The communications control module 1032 (using its transceiver control module 10321) is responsible for handling (generating/sending/receiving) signaling between the UDM/UDR 10 and other nodes, such as the UE 3, base station/(R)AN node 5, and AMF 9. Such signaling may include, for example, appropriately formatted signaling messages relating to access and mobility management procedures (for a particular UE 3), and in particular, signaling messages relating to UE subscription inquiries (e.g. carrying, if implemented, (further) RRC Inactive assistance information), and so on.

Modifications and Alternatives

Detailed aspects have been described above. As those skilled in the art will appreciate, a number of modifications and alternatives can be made to the above aspects whilst still benefiting from the disclosures embodied therein. By way of illustration only a number of these alternatives and modifications will now be described.

In the above description, the UE 3, the AMF 9, UDM/UDR 10, and the (R)AN node 5 are described for ease of understanding as having a number of discrete modules (such as the communication control modules). Whilst these modules may be provided in this way for certain applications, for example, where an existing system has been modified to implement the disclosure, in other applications, for example, in systems designed with the inventive features in mind from the outset, these modules may be built into the overall operating system or code and so these modules may not be discernible as discrete entities. These modules may also be implemented in software, hardware, firmware or a mix of these.

Each controller may comprise any suitable form of processing circuitry including (but not limited to), for example: one or more hardware implemented computer processors; microprocessors; central processing units (CPUs); arithmetic logic units (ALUs); input/output (JO) circuits; internal memories/caches (program and/or data); processing registers; communication buses (e.g. control, data and/or address buses); direct memory access (DMA) functions; hardware or software implemented counters, pointers and/or timers; and/or the like.

In the above aspects, a number of software modules were described. As those skilled in the art will appreciate, the software modules may be provided in compiled or un-compiled form and may be supplied to the UE 3, the AMF 9, the UDM/UDR 10 and the (R)AN node 5 as a signal over a computer network, or on a recording medium. Further, the functionality performed by part or all of this software may be performed using one or more dedicated hardware circuits. However, the use of software modules is preferred as it facilitates the updating of the UE 3, the AMF 9, and the (R)AN node 5 in order to update their functionalities.

In the above aspects, a 3GPP radio communications (radio access) technology is used. However, any other radio communications technology (e.g. WLAN, Wi-Fi, WiMAX, Bluetooth, etc.) may also be used in accordance with the above aspects.

Items of user equipment might include, for example, communication devices such as mobile telephones, smartphones, user equipment, personal digital assistants, laptop/tablet computers, web browsers, and/or e-book readers. Such mobile (or even generally stationary) devices are typically operated by a user, although it is also possible to connect so-called 'Internet of Things' (IoT) devices and similar machine-type communication (MTC) devices to the network. For simplicity, the present application refers to mobile devices (or UEs 3) in the description but it will be appreciated that the technology described can be implemented on any communication devices (mobile and/or generally stationary) that can connect to a communications network for sending/receiving data, regardless of whether such communication devices are controlled by human input or software instructions stored in memory.

Various other modifications will be apparent to those skilled in the art and will not be described in further detail here.

Abbreviations and Terminology

The following abbreviations and terminology (whenever differently stated) are used in the current disclosure:
3 GPP 3rd Generation Partnership Project
5G-AN 5G Access Network
5 G-RAN 5G Radio Access Network
5GS 5G System
AF Application Function
AMF Access and Mobility Management Function
AS Access Stratum
CN Core Network
DL Down Link
DRX Discontinuous Reception
EPS Evolved Packet System
HLR Home Location Register
HSS Home Subscriber Server
eNB enhanced NodeB
gNB next generation NodeB
MICO Mobile Originated Communication Only
MME Mobility management Entity
NAS Non Access Stratum
NF Network Function
NEF Network Exposure Function
NGAP NG Application Protocol
NR New Radio
O&M Operation and Maintenance
SGSN Serving GPRS Support Node
SRB Signaling Radio Bearer
(R)AN Radio Access Network
RAU Routing Area Update
RNA Ran Notification Area
RNC Radio Network Controller
RRC Radio Resource Control
TAU Tracking Area Update
XnAP Xn Application Protocol
UDM Unified Data Management
UDR Unified Data Repository
UE User Equipment
UL Up Link
UPF User Plane Function
URLLC Ultra Reliable Low Latency Communication (Supplementary Note 1)

A core network node for mobility management, comprising:
  a means for transmitting information related to expected mobility of user equipment, UE, to an access network node.

(Supplementary Note 2)

The core network node according to Supplementary Note 1, wherein
  the information related to the expected mobility of the UE includes information indicating a status of the expected mobility of the UE.

(Supplementary Note 3)

The core network node according to Supplementary Note 2, wherein
  the information indicating the status of the expected mobility of the UE indicates at least whether the UE is expected to be stationary or mobile.

(Supplementary Note 4)
The core network node according to Supplementary Note 1, wherein
the information related to the expected mobility of the UE includes trajectory information indicating an expected UE moving trajectory.

(Supplementary Note 5)
The core network node according to Supplementary Note 4, wherein
the trajectory information indicates an expected geographical trajectory of the UE.

(Supplementary Note 6)
The core network node according to Supplementary Note 4 or 5, wherein
the trajectory information includes information of a list of cells.

(Supplementary Note 7)
The core network node according to any one of Supplementary Notes 1 to 6, wherein
information indicating a status of UE mobility is transmitted within an N2 message included in core network assistance information.

(Supplementary Note 8)
The core network node according to any one of Supplementary Notes 1 to 7, wherein
information indicating a status of UE mobility is used by the access network node for controlling a radio resource control, RRC, Inactive state transition.

(Supplementary Note 9)
The core network node according to any one of Supplementary Notes 1 to 8, wherein
information indicating a status of UE mobility is used by the access network node for radio access network, RAN, Notification Area, RNA, configuration.

(Supplementary Note 10)
The core network node according to Supplementary Note 9, wherein
the RNA configuration includes a size of the RNA.

(Supplementary Note 11)
The core network node according to any one of Supplementary Notes 1 to 10, wherein
information indicating a status of UE mobility is derived from subscription information.

(Supplementary Note 12)
The core network node according to any one of Supplementary Notes 1 to 11, wherein
information indicating a status of UE mobility is provided via a network exposure function, NEF node.

(Supplementary Note 13)
An access network node, comprising:
a means for receiving information related to expected mobility of user equipment, UE, from a core network node for mobility management.

(Supplementary Note 14)
The access network node according to Supplementary Note 13, wherein
the information related to the expected mobility of the UE includes information indicating a status of the expected mobility of the UE.

(Supplementary Note 15)
The access network node according to Supplementary Note 14, wherein
the information indicating the status of the expected mobility of the UE indicates at least whether the UE is expected to be stationary or mobile.

(Supplementary Note 16)
The access network node according to Supplementary Note 13, wherein
the information related to the expected mobility of the UE includes trajectory information indicating an expected UE moving trajectory.

(Supplementary Note 17)
The access network node according to Supplementary Note 16, wherein
the trajectory information indicates an expected geographical trajectory of the UE.

(Supplementary Note 18)
The access network node according to Supplementary Note 16 or 17, wherein
the trajectory information includes information of a list of cells.

(Supplementary Note 19)
The access network node according to any one of Supplementary Notes 13 to 18, wherein
information indicating a status of UE mobility is transmitted within an N2 message included in core network assistance information.

(Supplementary Note 20)
The access network node according to any one of Supplementary Notes 13 to 19, wherein
information indicating a status of UE mobility is used by the access network node for controlling a radio resource control, RRC, Inactive state transition.

(Supplementary Note 21)
The access network node according to any one of Supplementary Notes 13 to 20, wherein
information indicating a status of UE mobility is used by the access network node for radio access network, RAN, Notification Area, RNA, configuration.

(Supplementary Note 22)
The access network node according to Supplementary Note 21, wherein
the RNA configuration includes a size of the RAN.

(Supplementary Note 23)
The access network node according to any one of Supplementary Notes 13 to 22, wherein
information indicating a status of UE mobility is derived from subscription information.

(Supplementary Note 24)
The access network node according to any one of Supplementary Notes 13 to 23, wherein
information indicating a status of UE mobility is provided via a network exposure function, NEF node.

(Supplementary Note 25)
A mobility management method executed by a core network node for mobility management, the mobility management method comprising:
transmitting information related to expected mobility of user equipment, UE, to an access network node.

(Supplementary Note 26)
The mobility management method according to Supplementary Note 25, wherein
the information related to the expected mobility of the UE includes information indicating a status of the expected mobility of the UE.

(Supplementary Note 27)
The mobility management method according to Supplementary Note 26, wherein
the information indicating the status of the expected mobility of the UE indicates at least whether the UE is expected to be stationary or mobile.

(Supplementary Note 28)
The mobility management method according to Supplementary Note 25, wherein
the information related to the expected mobility of the UE includes trajectory information indicating an expected UE moving trajectory.

(Supplementary Note 29)
The mobility management method according to Supplementary Note 28, wherein
the trajectory information indicates an expected geographical trajectory of the UE.

(Supplementary Note 30)
The mobility management method according to Supplementary Note 28 or 29, wherein
the trajectory information includes information of a list of cells.

(Supplementary Note 31)
The mobility management method according to any one of Supplementary Notes 25 to 30, wherein
information indicating a status of UE mobility is transmitted within an N2 message included in core network assistance information.

(Supplementary Note 32)
The mobility management method according to any one of Supplementary Notes 25 to 31, wherein
information indicating a status of UE mobility is used by the access network node for controlling a radio resource control, RRC, Inactive state transition.

(Supplementary Note 33)
The mobility management method according to any one of Supplementary Notes 25 to 32, wherein
information indicating a status of UE mobility is used by the access network node for radio access network, RAN, Notification Area, RNA configuration.

(Supplementary Note 34)
The mobility management method according to Supplementary Note 33, wherein
the RNA configuration includes a size of the RNA.

(Supplementary Note 35)
The mobility management method according to any one of Supplementary Notes 25 to 34, wherein
information indicating a status of UE mobility is derived from subscription information.

(Supplementary Note 36)
The mobility management method according to any one of Supplementary Notes 25 to 35, wherein
information indicating a status of UE mobility is provided via a network exposure function, NEF node.

(Supplementary Note 37)
A mobility management method executed by an access network node, the mobility management method comprising:
receiving information related to expected mobility of user equipment, UE, from a core network node for mobility management.

(Supplementary Note 38)
The mobility management method according to Supplementary Note 37, wherein
the information related to the expected mobility of the UE includes information indicating a status of the expected mobility of the UE.

(Supplementary Note 39)
The mobility management method according to Supplementary Note 38, wherein
the information indicating the status of the expected mobility of the UE indicates at least whether the UE is expected to be stationary or mobile.

(Supplementary Note 40)
The mobility management method according to Supplementary Note 37, wherein
the information related to the expected mobility of the UE includes trajectory information indicating an expected UE moving trajectory.

(Supplementary Note 41)
The mobility management method according to Supplementary Note 40, wherein
the trajectory information indicates an expected geographical trajectory of the UE.

(Supplementary Note 42)
The mobility management method according to Supplementary Note 40 or 41, wherein
the trajectory information includes information of a list of cells.

(Supplementary Note 43)
The mobility management method according to any one of Supplementary Notes 37 to 42, wherein
information indicating a status of UE mobility is transmitted within an N2 message included in core network assistance information.

(Supplementary Note 44)
The mobility management method according to any one of Supplementary Notes 37 to 43, wherein
information indicating a status of UE mobility is used by the access network node for controlling a radio resource control, RRC, Inactive state transition.

(Supplementary Note 45)
The mobility management method according to any one of Supplementary Notes 37 to 44, wherein
information indicating a status of UE mobility is used by the access network node for radio access network, RAN, Notification Area, RNA, configuration.

(Supplementary Note 46)
The mobility management method according to Supplementary Note 45, wherein
the RNA configuration includes a size of the RNA.

(Supplementary Note 47)
The mobility management method according to any one of Supplementary Notes 37 to 46, wherein
information indicating a status of UE mobility is derived from subscription information.

(Supplementary Note 48)
The mobility management method according to any one of Supplementary Notes 37 to 47, wherein
information indicating a status of UE mobility is provided via a network exposure function, NEF node.

(Supplementary Note 49)
A network system comprising:
the core network node according to any one of Supplementary Notes 1 to 12; and
the access network node according to any one of Supplementary Notes 13 to 24.

The program described in the above example aspects is stored in a storage device or recorded on a computer-readable recording medium. For example, the recording medium is a portable medium such as a flexible disk, an optical disk, a magneto-optical disk, and a semiconductor memory.

Although the present disclosure has been described above with reference to the example aspects, the present disclosure is not limited to the above-described example aspects. The configurations and details of the present disclosure can be changed in various manners that can be understood those skilled in the art within the scope of the present disclosure.

This application is based upon and claims the benefit of priority from European patent application No. 18151514.9, filed on Jan. 12, 2018, the disclosure of which is incorporated herein in its entirely by reference.

EXPLANATION OF REFERENCE SYMBOLS 1 telecommunication system
3 UE
31 transceiver circuit
32 antenna
33 controller
34 memory
341 operating system
342 communications control module
3421 transceiver control module
35 user interface
5 (R)AN/gNB (BASE STATION)
51 transceiver circuit
52 antenna
53 controller
54 memory
541 operating system
542 communications control module
5421 transceiver control module
55 network interface
7 core network
9 AMF
91 transceiver circuit
92 controller
93 memory
931 operating system
932 communications control module
9321 transceiver control module
94 network interface
10 UDM/UDR
101 transceiver circuit
102 controller
103 memory
1031 operating system
1032 communications control module
10321 transceiver control module
104 network interface
11 GW(gateways)
12 AUSF
20 external IP network

The invention claimed is:

1. A mobility management method executed by an Access and Mobility Management Function (AMF) node, the mobility management method comprising:
retrieving an expected User Equipment (UE) behavior parameter from a data management node; and
sending, to a radio access network (RAN), a message for N2 connection between the AMF node and the RAN based on the expected UE behavior parameter, wherein the message comprises assistance information for controlling radio resource control (RRC) Inactive state transitions in the RAN,
wherein the assistance information comprises expected UE moving trajectory information indicating the UE's expected movement and UE mobility information indicating whether the UE is stationary or mobile.

2. The mobility management method according to claim 1, wherein the expected UE moving trajectory information includes information of a list of cells.

3. The mobility management method according to claim 1, wherein the expected UE moving trajectory information is used by the RAN for RAN Notification Area (RNA) configuration.

4. The mobility management method according to claim 3, wherein the RNA configuration includes a size of an RNA.

5. A mobility management method executed by a radio access node (RAN), the mobility management method comprising:
receiving, from an Access and Mobility Management Function (AMF) node that retrieves an expected User Equipment (UE) behavior parameter from a data management node, a message for N2 connection between the AMF node and the RAN based on the expected UE behavior parameter, wherein the message comprises assistance information for controlling radio resource control (RRC) Inactive state transitions in the RAN, and wherein the assistance information comprises expected UE moving trajectory information indicating the UE's expected movement and UE mobility information indicating whether the UE is stationary or mobile.

6. The mobility management method according to claim 5, wherein the expected UE moving trajectory information includes information of a list of cells.

7. The mobility management method according to claim 5, wherein the expected UE moving trajectory information indicating a status of UE mobility is used by the RAN for RAN Notification Area (RNA) configuration.

8. The mobility management method according to claim 7, wherein the RNA configuration includes a size of the RNA.

9. An Access and Mobility Management Function (AMF) node, comprising:
a memory storing instructions; and
at least one processor configured to process the instructions to:
retrieve an expected User Equipment (UE) behavior parameter from a data management node, and
send, to a radio access network (RAN), a message for N2 connection between the AMF node and the RAN based on the expected UE behavior parameter, wherein the message comprises assistance information for controlling radio resource control (RRC) Inactive state transitions in the RAN, and wherein the assistance information comprises expected UE moving trajectory information indicating the UE's expected movement and UE mobility information indicating whether the UE is stationary or mobile.

10. A radio access network (RAN), comprising:
a memory storing instructions; and
at least one processor configured to process the instructions to:
receive, from an Access and Mobility Management Function (AMF) node that retrieves an expected User Equipment (UE) behavior parameter from a data management node, a message for N2 connection between the AMF node and the RAN, based on the expected UE behavior parameter, wherein the message comprises assistance information for controlling radio resource control (RRC) Inactive state transitions in the RAN, and wherein the assistance information comprises expected UE moving trajectory information indicating the UE's expected movement and UE mobility information indicating whether the UE is stationary or mobile.

* * * * *